United States Patent [19]

Murakami

[11] Patent Number: 4,612,615
[45] Date of Patent: Sep. 16, 1986

[54] THROTTLE CONTROL SYSTEM FOR AUTOMOTIVE VEHICLE

[75] Inventor: Terukiyo Murakami, Yokosuka, Japan

[73] Assignee: Nissan Motor Company, Limited, Japan

[21] Appl. No.: 597,915

[22] Filed: Apr. 9, 1984

[30] Foreign Application Priority Data

Apr. 11, 1983 [JP] Japan .................................. 58-63284

[51] Int. Cl.[4] .......................... F02D 9/00; G06G 7/70
[52] U.S. Cl. ................................ 364/431.07; 123/361; 123/399
[58] Field of Search ............... 123/360, 361, 352, 399, 123/403, 359; 364/431.03, 431.07, 426

[56] References Cited

U.S. PATENT DOCUMENTS

| | | | |
|---|---|---|---|
| 4,112,885 | 9/1978 | Iwata et al. | 123/361 |
| 4,120,373 | 10/1978 | Fleischer | 123/399 |
| 4,188,926 | 2/1980 | Fleischer | |
| 4,245,599 | 1/1981 | DesLauriers | 123/361 |
| 4,319,658 | 3/1982 | Collonia et al. | 123/361 |
| 4,374,422 | 2/1983 | O'Keefe, Jr. et al. | 123/352 |
| 4,380,799 | 4/1983 | Allard et al. | 123/361 |
| 4,455,978 | 6/1984 | Atago et al. | 123/361 |
| 4,506,642 | 3/1985 | Pfalzgraf et al. | 123/361 |
| 4,519,360 | 5/1985 | Murakami | 123/399 |

FOREIGN PATENT DOCUMENTS

| | | |
|---|---|---|
| 0060326 | 9/1982 | European Pat. Off. |
| 3028601 | 6/1981 | Fed. Rep. of Germany |
| 2343622 | 10/1977 | France |
| 57-44750 | 3/1982 | Japan |
| 2068456 | 8/1981 | United Kingdom |

OTHER PUBLICATIONS

Automotive Engineering, vol. 90 (1982), Jun., No. 6, pp. 97-99.

Primary Examiner—Parshotam S. Lall
Attorney, Agent, or Firm—Schwartz, Jeffery, Schwaab, Mack, Blumenthal & Evans

[57] ABSTRACT

In a throttle control system including electrical elements or devices, if trouble occurs in these elements, there exists a problem in that the throttle valve is further driven forcibly in spite of the fact that the throttle valve has already been fully closed or opened. To overcome the above problem, a throttle valve close-limit switch and a throttle valve open-limit switch are additionally provided for the accelerator control system, in order to generate an alarm signal or a system disabling signal in the case where the difference between the target throttle opening rate and the actual throttle opening rate exceeds a predetermined value when one of the limit switches is on.

3 Claims, 7 Drawing Figures

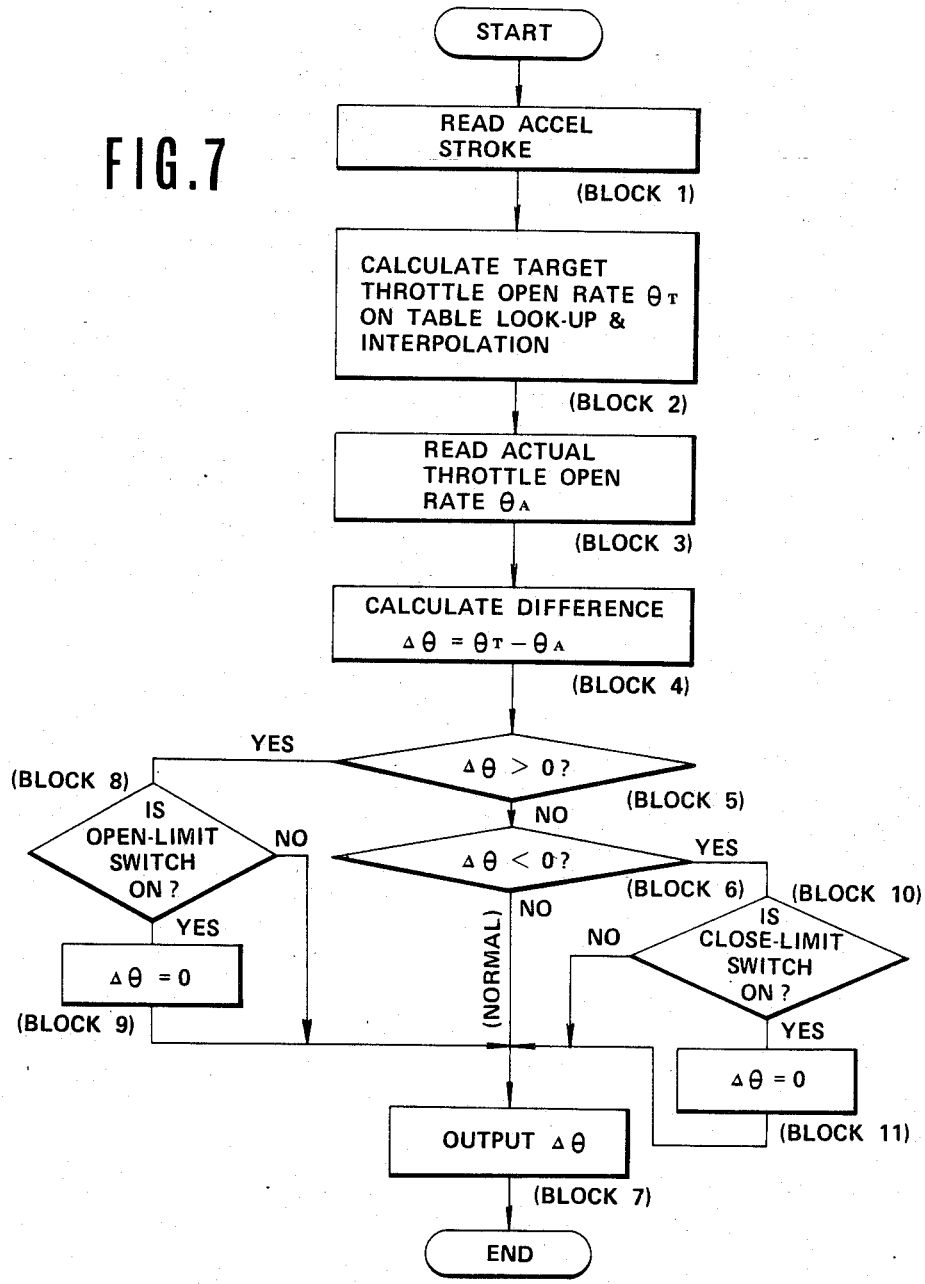

THROTTLE CONTROL SYSTEM FOR AUTOMOTIVE VEHICLE

BACKGROUND OF THE INVENTION

1. Field of the Invention

The present invention relates generally to a throttle control system for an automotive vehicle by which a throttle valve opening rate is controlled via electrical or pneumatic devices in response to accelerator pedal stroke, and more specifically to a control system which outputs an alarm or a disabling signal in when the control system is abnormal.

2. Description of the Prior Art

In an automotive vehicle, when an accelerator pedal is depressed by the driver, a throttle valve disposed in a carburetor is opened to accelerate the vehicle. Conventionally, the relationship between the stroke of the accelerator pedal depressed by the driver and the opening rate or position of the throttle valve is fixedly predetermined in dependence upon the mechanical structure of the throttle device.

For instance, in the case of a single barrel throttle device, because the throttle valve opening rate is predetermined to be roughly linear in proportion to the accelerator pedal stroke, throttle valve opening rate increases relatively abruptly with increasing accelerator pedal stroke.

These accelerator pedal control characteristics are suitable for accelerating the vehicle quickly, for instance, to avert danger when the vehicle is travelling at a high speed on a highway. However, these control characteristics are not suitable for repeatedly and finely driving the vehicle a little forward slowly when the vehicle is travelling at a low speed on a busy street. In contrast, in the case of a twin barrel throttle device, because the throttle valve opening rate is predetermined to be delayed according to the accelerator pedal stroke, throttle valve opening rate increases relatively gently with increasing accelerator pedal stroke. Therefore, the accelerator pedal control characteristics are suitable for repeatedly and finely driving the vehicle a little forward slowly when the vehicle is travelling at a low speed on a busy street. However, these are not suitable for accelerating the vehicle quickly to avert danger when the vehicle is travelling at a high speed on a highway.

That is to say, in the conventional accelerator device, it is impossible to freely obtain appropriate accelerator pedal control characteristics indicative of the relationship between throttle valve opening rate and accelerator pedal stroke according to the driver's preference or vehicle travelling conditions.

In order to overcome the above-mentioned problems, the same inventor has proposed a novel accelerator pedal control system for an automotive vehicle such that any appropriate accelerator pedal control characteristics representative of relationship between throttle valve opening rate and accelerator pedal stroke can be selected freely by driver's preference according to vehicle travelling conditions, which has already been filed on Dec. 23, 1983 as U.S. patent application Ser. No. 564,682 or on Dec. 27, 1983 as EPC Patent Application No. 83113143.8.

In such a control system as described above, however, since there are arranged a number of electrical or pneumatic devices such as potentiometers encoders, motors, switches, sensors, etc. between the accelerator pedal and the throttle valve, there exists a problem in that the throttle valve is further driven forcibly, in spite of the fact that the throttle valve has been fully closed or opened, because these devices operate abnormally due to potentiometer looseness or aging, element failure, etc. When such trouble occurs, some elements of the system may be damaged.

SUMMARY OF THE INVENTION

With these problems in mind, therefore, it is the primary object of the present invention to provide a throttle control system for an automotive vehicle which outputs an alarm signal or a system-disabling signal or a command signal to compulsorily close a throttle value in case the throttle valve is further driven forcibly in spite of the fact that the throttle valve is fully closed or opened.

To achieve the above-mentioned object, the throttle control system for an automotive vehicle according to the present invention comprises an accelerator pedal, a throttle valve, means for detecting a stroke of said accelerator pedal and outputting an accelerator pedal stroke signal, means for calculating a target throttle valve opening rate in response to the detected accelerator pedal stroke signal and generating a target throttle valve opening rate command signal, means for detecting an actual throttle valve opening rate and outputting an actual throttle valve opening rate signal, means for driving said throttle valve in response to the target throttle valve opening rate control signal and the throttle valve opening rate signal, means for detecting that said throttle valve is driven to its extreme position and outputting a throttle valve extreme position signal, and means for generating an abnormality command signal in the case where the difference between the target throttle valve opening rate and the actual throttle valve opening rate exceeds a predetermined value when the throttle valve extreme position signal is detected.

BRIEF DESCRIPTION OF THE DRAWINGS

The features and advantages of the throttle control system for an automotive vehicle according to the present invention will be more clearly appreciated from the following description taken in conjunction with the accompanying drawings in which like reference numerals designate corresponding elements and in which:

FIG. 5 is a timing chart showing the times when the throttle close-limit switch and the throttle openlimit switch are turned on;

FIG. 7 is a program control flowchart showing the control steps of the throttle control system according to the present invention.

DETAILED DESCRIPTION OF THE PREFERRED EMBODIMENTS

Figure 1:
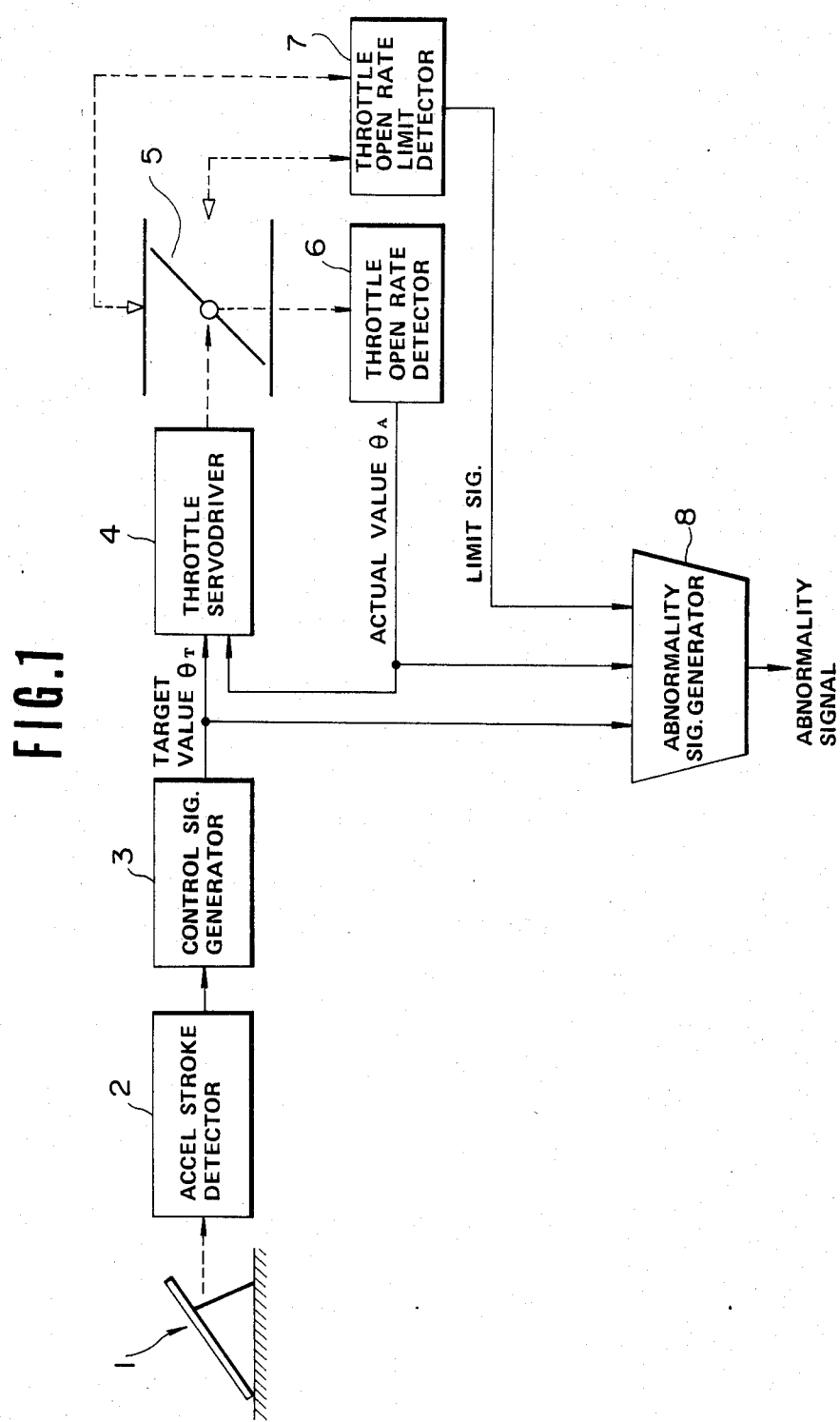
FIG. 1 is a schematic block diagram of a first embodiment of the throttle control system for an automotive vehicle according to the present invention.

In view of the above description, reference is now made to a first embodiment of the present invention. With reference to FIG. 1, the throttle control system of the present invention comprises an accelerator pedal 1, an accelerator pedal stroke detector 2, a control signal generator 3, a throttle servodriver 4, a throttle valve 5, a throttle open-rate detector 6, a throttle open-rate limit detector 7, and an abnormality signal generator 8.

The accelerator pedal stroke detector 2 detects the stroke of the accelerator pedal 1. The control signal generator 3 reads a stroke signal outputted from the accelerator pedal stroke detector 2, determines a target throttle valve opening rate by looking-up a table in which control characteristics representative of relationship between throttle valve opening rate and accelerator pedal stroke are listed and by executing necessary interpolation calculations, and outputs a target command signal to the throttle servodriver 4. The throttle servodriver 4 drives the throttle valve 5 in accordance with the target command signal $\theta_T$ outputted from the control signal generator 3 and a feedback signal (described later). The throttle open-rate detector 6 detects the actual throttle opening-rate and outputs a feedback signal $\theta_A$ indicative of an actual throttle opening-rate to the throttle servodriver 4. The servodriver 4 drives the throttle valve 5 so that the difference $(\theta_T - \theta_A)$ can be reduced to zero. The throttle open-rate limit switch 7 detects that the throttle 5 is driven to its extreme fully-open position or fully-closed position. The abnormality signal generator 7 receives three signals of the target command signal $\theta_T$ generated by the control signal generator 3, the feedback signal $\theta_A$ indicative of the actual throttle valve opening-rate generated by the throttle open-rate detector 6, and the extreme-position signal generated by the throttle open-rate limit detector 7, respectively, and outputs an abnormality command signal when the difference between the target throttle opening rate $\theta_T$ and the actual throttle opening rate $\theta_A$ exceeds a predetermined value when the throttle open rate limit switch 7 detects the throttle valve extreme position. This is because whenever the throttle valve is driven to its extreme position (fully-open or -closed position), the difference $(\theta_T - \theta_A)$ must be zero as far as the system operates normally. This abnormality command signal is usable for producing an alarm signal, a command signal to disable the entire system or another command signal to return the throttle valve to its initial position.

Figure 2:
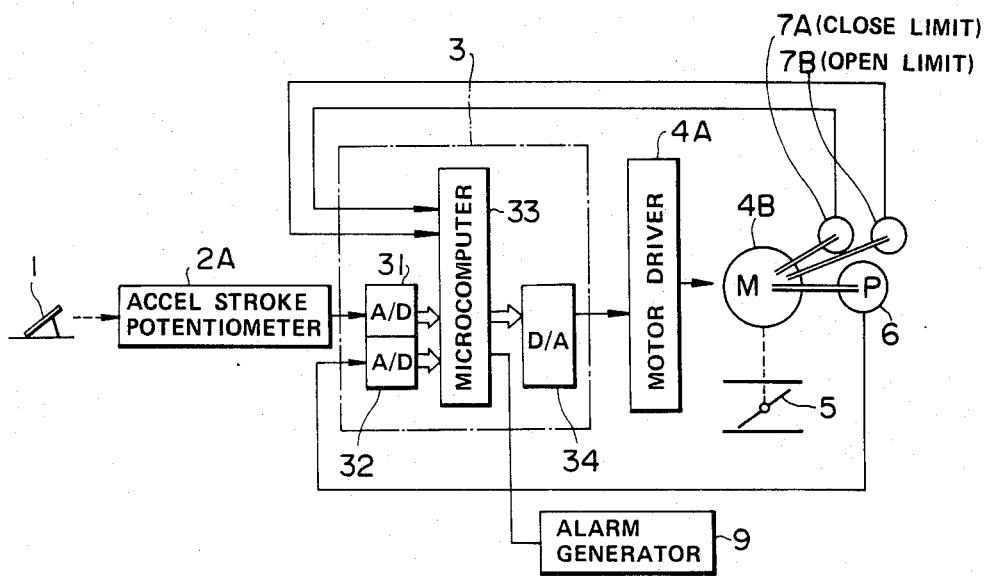
FIG. 2 is a schematic block diagram of a second embodiment of the throttle control system for an automotive vehicle according to the present invention.

FIG. 2 is a schematic block diagram of a second embodiment of the throttle control system according to the present invention. In FIG. 2, the system comprises an accelerator pedal stroke potentiometer 2A, a control signal generator 3 including analog-to-digital converters 31 and 32, a microcomputer 33 and a digital-to-analog converter 34, a motor driver 4A, a motor 4B, a throttle opening rate potentiometer 6, a throttle close-limit switch 7A, a throttle open-limit switch 7B, and an alarm generator 9.

The accelerator pedal stroke potentiometer 2A outputs an analog signal the voltage level of which is proportional to the stroke of the accelerator pedal.

Figure 3:
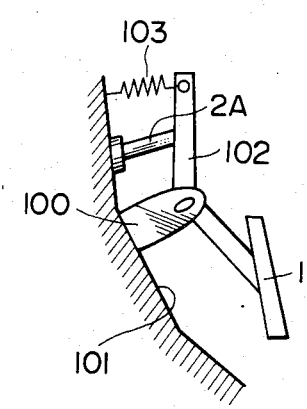
FIG. 3 is a pictorial illustration showing an exemplary structure for detecting accelerator pedal stroke used with the throttle control system according to the present invention.

FIG. 3 is a pictorial illustration showing an example of the structure of an accelerator pedal provided with the stroke potentiometer 2A. A bracket 100 is fixed at an appropriate position to the floor 101 of a vehicle body. The middle portion of a shallow-V-shaped pedal lever 102 is pivotably supported by the bracket 100. The accelerator pedal 1 is fixed to one end of the pedal lever 102. A return spring 103 is disposed between the floor 101 and the other end of the pedal lever 102. The pedal 1 is urged by this return spring 103 to its zero-stroke position when released. The accelerator pedal stroke potentiometer 2A is disposed between the floor 101 and the pedal lever 102. This potentiometer 2A of the linear sliding-contact resistance type outputs analog voltage signals indicative of accelerator pedal stroke.

The control signal generator 3 receives the stroke signal from the accelerator stroke potentiometer 2A through the analog-to-digital converter 31, the feedback signal indicative of the actual throttle valve opening rate through the analog-to-digital converter 32, and two signals outputted from the throttle close-limit switch 7A and the throttle open-limit switch 7B. The microcomputer 33 determines a target throttle valve opening rate $\theta_T$ in accordance with table look-up method and interpolation, calculates the difference between the target value $\theta_T$ and the actual value $\theta_A$, and outputs a command signal through the digital-to-analog converter 34.

The motor driver 4A receives the target command signal $(\theta_T - \theta_A)$ from the control signal generator 3, and drives the motor 4B in the direction that the difference $(\theta_T - \theta_A)$ between the two signals is reduced to zero. The throttle close-limit and open-limit switches 7A and 7B are turned on when the throttle valve 5 is positioned at its fully-closed and -open positions, respectively.

Figure 4:
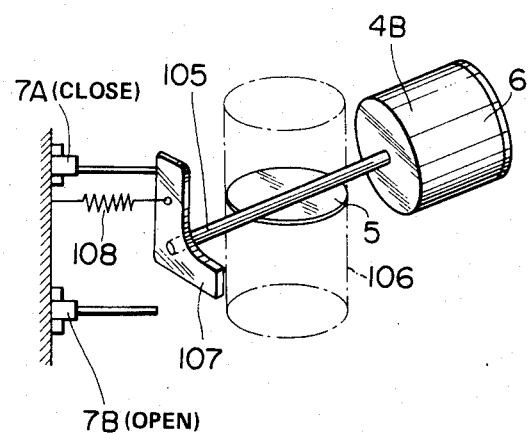
FIG. 4 is a pictorial illustration showing an exemplary structure for detecting throttle valve opening rate used with the throttle control system according to the present invention.
Figure 5:
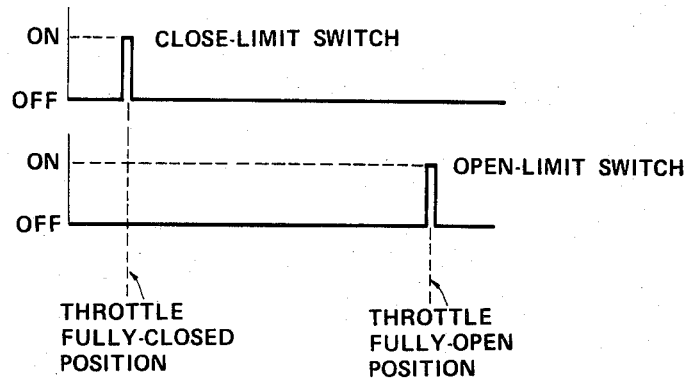

FIG. 4 is a pictorial illustration showing an example of the structure of a throttle valve provided with the throttle limit switches 7A and 7B and the throttle potentiometer 6. The throttle valve 5 is fixed to a throttle shaft 105 pivotably supported at an appropriate position to an intake air conduit 106. The shaft 105 is directly connected to a driven shaft of the motor 4B. At the end of the throttle shaft 105, an L-shaped lever 107 is fixed. A return spring 108 is disposed to urge the throttle valve 5 to its initial position. The throttle close-limit switch 7A is disposed at such a position as to be turned on when the throttle valve is returned to its initial position, as depicted in FIG. 5. The throttle open-limit switch 7B is disposed at such a position as to be turned on when the throttle valve is shifted to its extreme open position, as also depicted in FIG. 5. The throttle potentiometer 6 is attached on the flat end of the motor 4B. This potentiometer 6 is of the rotary sliding-contact resistance type. The potentiometer 6 includes a rotatable sliding contact coupled with the driven shaft 105 of the motor 4B and a circular resistance on which the sliding contact slides. Therefore, when the motor 4B rotates through an angle, since the sliding contact also slides on and along the circular resistance together with the throttle valve 5, the potentiometer 6 outputs an analog signal the voltage level of which is proportional to the angular stroke of the throttle valve 5. Further, since the lever 107 is urged by the return spring 108 in the direction that the throttle valve is closed, when current is not supplied to the motor 4B, the throttle valve 5 is fully closed by the force of the return spring 108.

In the second embodiment shown in FIG. 2, the throttle valve opening rates are represented by voltages detected by the throttle potentiometer 6.

Figure 6:
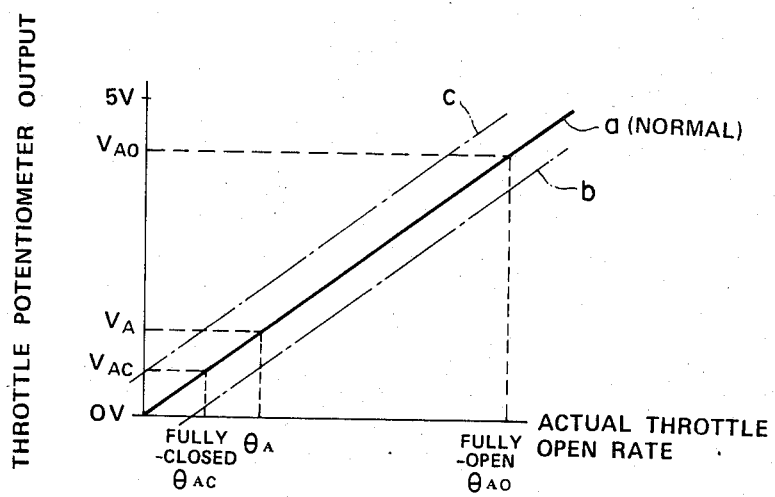
FIG. 6 is a graphical representation showing an example of the relationship between the output voltage of the throttle valve potentiometer and the actual throttle valve opening rate, in which the solid line a represents

FIG. 6 shows the relationship between the throttle valve opening rate (abscissa) and the throttle valve potentiometer output voltage (ordinate). In the normal state, the throttle valve potentiometer 6 output is predetermined as follows: when the throttle valve is fully closed ($\theta_{AC}$), a voltage of $V_{AC}$ is outputted; when fully opened ($\theta_{AO}$), a voltage of $V_{AO}$ is outputted; when moderately opened ($\theta_A$), a voltage of $V_A$ is outputted, as depicted by the solid line a in FIG. 6. However, once the potentiometer 6 goes into an abnormal state due to looseness, aging, etc., the relationship between the throttle valve opening-rate and the potentiometer output voltage is shifted to either side of the line a, as depicted by the dotted and dashed lines b and c in FIG. 6.

In the case where the throttle potentiometer output is shifted lower than the normal line a, as shown by the line b in FIG. 6, the system operates abnormally as follows: when a command signal to close the throttle valve to its fully-closed position is outputted, since the throttle potentiometer 6 cannot output a voltage $V_{AC}$ but a voltage $V_{AC}'$ lower than $V_{AC}$, the difference $\Delta V = V_{AC} - V_{AC}'$ is held at a positive value in spite of the fact that the throttle valve 5 is fully closed, so that the throttle valve is kept open beyond its extreme close position. When a command signal to open the throttle valve to its fully-open position is outputted, since the throttle potentiometer 6 cannot output a voltage $V_{AO}$ but a voltage $V_{AO}'$ lower than $V_{AO}$, the difference $\Delta V = V_{AO} - V_{AO}'$ is also held at a positive value in spite of the fact that the throttle valve 5 is fully opened, so that the throttle valve is further driven forcibly beyond its extreme open position.

In the case where the throttle potentiometer output is shifted higher than the normal line a, as shown by the line c in FIG. 6, the system operates abnormally as follows: when a common signal to close the throttle valve to its fully-closed position is outputted, since the throttle potentiometer cannot output a voltage $V_{AC}$ but a voltage $V_{AC}'$ higher than $V_{AC}$, the difference $\Delta V = V_{AC} - V_{AC}'$ is held at a negative value in spite of the fact that the throttle valve 5 is fully closed, so that the throttle valve is further driven forcibly beyond its extreme closed position. When a command signal to open the throttle valve to its fully-open position is outputted, since the throttle potentiometer 6 cannot output a voltage $V_{AO}$ but a voltage $V_{AO}'$ higher than $V_{AO}$, the difference $\Delta V = V_{AO} - V_{AO}'$ is also held at a negative value in spite of the fact that the throttle valve is fully opened, so that the throttle valve is kept ahead of its extreme open position.

The object of this invention is to overcome the above-mentioned problems by forcedly resetting the difference $\Delta \theta$ or $\Delta V$ to zero whenever the throttle valve is fully closed or opened.

FIG. 7 is a flowchart of an example of a control program used for the microcomputer 33. With reference to FIG. 7, the operation of the second embodiment of the present invention will be described hereinbelow. First, the control reads the accelerator pedal stroke data outputted from the accelerator pedal stroke potentiometer 2A via the analog-to-digital converter 31 (in block 1). In response to the read pedal stroke data, the control looks up a previously-stored table and performs a required interpolation calculation in order to obtain a target throttle valve opening rate $\theta_T$ corresponding to the read accelerator pedal stroke (in block 2). Then, the control reads an actual or feedback throttle valve opening rate $\theta_A$ outputted from the throttle valve opening rate potentiometer 6 via the analog-to-digital converter 32 (in block 3) and calculates the difference ($\Delta \theta$ $\theta_T - \theta_A$) in throttle valve opening rate between the target value $\theta_T$ and the actual (feedback) value $\theta_A$ (in block 4). Here, if the calculated value $\Delta \theta$ is zero; that is, when the actual throttle valve opening rate $\theta_A$ matches the target throttle valve opening rate $\theta_T$, the succeeding steps (blocks 5 and 6) are both "NO", control advances to the next step to output a command signal ($\Delta \theta = 0$) (in block 7). Therefore, the motor driver 4A outputs no signal, so that the motor 4B stops rotating and thus the throttle valve 5 is kept at its balanced position.

If $\Delta \theta > 0$, the control determines "YES" (in block 5) and then checks whether or not the throttle open limit switch 7B is ON (in block 8). If the throttle open limit switch 7B is not ON, that is, OFF, this indicates that the throttle valve 5 is not yet fully opened, control directly advances to the succeeding step (block 7) to output a command signal ($\Delta \theta > 0$) to the motor driver 4A, so that the motor 4B rotates, in a predetermined direction that the throttle valve opening rate is increased, until the difference $\Delta \theta = \theta_T - \theta_A$ reaches zero. Here, if control determines "YES" (in block 8), this indicates that the system is abnormal, because when the throttle open-limit switch 7B is ON (i.e. throttle valve is fully open), it is impossible that the target opening rate $\theta_T$ is greater than the actual opening rate $\theta_A$ (i.e. $\Delta \theta > 0$) or that the throttle valve should further be opened. Such an abnormal case as described above may be produced when the output voltage of the throttle potentiometer 6 is set to an abnormal value lower than the normal value, as depicted by the dotted and dashed line b in FIG. 6. In more detail, in spite of the fact that the throttle valve 5 is fully opened, since the throttle potentiometer 6 cannot output a voltage of $V_{AO}$ but a voltage lower than $V_{AO}$, the difference $\Delta \theta (= \theta_T - \theta_A)$ is held at a positive value. Therefore, when control determines "YES" (in block 8), the difference $\Delta \theta$ is forcedly reset to zero (in block 9). Control advances to the next step to output a command signal ($\Delta \theta = 0$) (in block 7). Therefore, the motor driver 4A outputs no signal, so that the motor 4B stops rotating and thus the throttle valve 5 is kept at its fully-opened position. As a result, it is possible to prevent damage of the system due to overload caused when the throttle valve is further driven excessively after having fully been opened.

Similarly, if $\Delta \theta < 0$, control determines "YES" (in block 6) and then checks whether or not the throttle close limit switch 7A is ON (in block 10). If the throttle close limit switch 7A is not ON, that is, OFF, this indicates that the throttle valve 5 is not yet fully closed, control directly advances to the succeeding step (block 7) to output a command signal ($\Delta \theta < 0$) to the motor driver 4A, so that the motor 4B rotates, in a predetermined direction that the throttle valve opening rate is decreased, until the difference $\Delta \theta = \theta_T - \theta_A$ reaches zero. Here, if control determines "YES" (in block 10), this indicates that the system is abnormal, because when the throttle close-limit switch 7A is ON (i.e. throttle valve is fully closed), it is impossible that the target opening rate $\theta_T$ is smaller than the actual opening rate $\theta_A$ (i.e. $\Delta \theta < 0$) or that the throttle valve should further be closed. Such an abnormal case as described above may be produced when the output voltage of the throttle potentiometer 6 is set to an abnormal value higher than the normal value, as depicted by the dotted and dashed line c in FIG. 6. In more detail, in spite of the fact that the throttle valve 5 is fully closed, since the throttle potentiometer 6 cannot output a voltage $V_{AC}$ but a voltage higher than $V_{AC}$, the difference $\Delta\theta(=\theta_T-\theta_A)$ is held at a negative value. Therefore, when control determines "YES" (in block 10), the difference $\Delta\theta$ is forcedly reset to zero (in block 11). Control advances to the next step to output a command signal ($\Delta\theta=0$) (in block 7). Therefore, the motor driver 4A outputs no signal, so that the motor 4B stops rotating and thus the throttle valve 5 is kept at its fully-closed position. As a result, it is possible to prevent damage of the system due to overload caused when the throttle valve is further driven excessively after having fully been closed.

Further, in case the above-mentioned steps shown by blocks 9 and 10 are implemented, it is preferable to output an alarm signal to the alarm generator 9. In dependence upon this alarm signal, it is possible to inform the driver of the fact that there exists and abnormality in the control system. As the alarm system, a buzzer, a voice warning, an alarm light, an alarm display, etc. are used. Further, in response to this alarm signal, it is possible to cut-off the current supplied to the motor 4B, that is, to disable the motor 4B. In this case, the throttle valve 5 is forcedly returned to its initial position by the elastic force of the return spring 108. Further, in response to this alarm signal, it is possible to hold the throttle valve at its fully-opened position by actuating an appropriate latch mechanism.

Further, in the above-mentioned embodiments, a resistance-type potentiometer is used as the accelerator pedal stroke potentiometer 2A or the throttle valve opening rate potentiometer 6. However, it is of course possible to use a pulse encoder which can output encoded pulse signals representative of position, in place of the potentiometer. Furthermore, in the above-mentioned embodiments, a mechanical limit switch is used as the throttle close-limit switch 7A and the throttle open-limit switch 7B. However, it is of course possible to use other switches such as a slide switch having a movable contact and a fixed contact, a pressure sensitive switch, a magnetic sensitive switch, etc.

Further, in the above-mentioned embodiments, the motor 4B is used for driving the throttle valve 5. However, it is of course possible to use other hydraulic or pneumatic actuator.

As described above, in the throttle control system for an automotive vehicle by which the throttle valve is controlled, by means of electrical, hydraulic or pneumatic driving system, according to the accelerator pedal stroke, in case where an abnormal state occurs such that the throttle valve is further driven forcibly in spite of the fact that the throttle valve has already been closed or opened fully, because of failure or trouble occurred in the devices or elements incorporated within the system, it is possible to detect the abnormality and prevent damage of the system due to overload applied to the system, thus improving the reliability of the system.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A throttle control system for an automotive vehicle, which comprises:
   (a) an accelerator pedal;
   (b) a throttle valve having an extreme open position and an extreme closed position;
   (c) means for detecting a stroke of said accelerator pedal and outputting an accelerator pedal stroke signal;
   (d) means for calculating a target throttle valve opening position in response to the detected accelerator pedal stroke signal and generating a target throttle valve opening position control command signal corresponding thereto;
   (e) means for detecting an actual throttle valve opening position and outputting an actual throttle valve opening position signal corresponding thereto;
   (f) means for driving said throttle valve in response to the target throttle valve opening position control command signal and the actual throttle valve opening position signal;
   (g) means for detecting that said throttle valve is driven to one of said extreme positions and outputting a throttle valve extreme position signal corresponding thereto; and
   (h) means responsive to the target throttle valve opening position control signal, the actual throttle valve opening position and the throttle valve extreme position signal for generating an abnormality command signal when the difference between the target throttle opening position and the actual throttle valve opening position exceeds a predetermined value when the throttle valve extreme position signal is detected.

2. A throttle control system for an automotive vehicle, which comprises:
   (a) an accelerator pedal;
   (b) a throttle valve having an extreme open position and an extreme closed position;
   (c) an accelerator pedal stroke potentiometer for outputting a pedal stroke signal;
   (d) a throttle valve potentiometer for outputting an actual throttle valve opening position signal $\theta_A$;
   (e) a throttle valve close-limit switch for outputting a throttle valve fully-closed position signal corresponding thereto;
   (f) a throttle valve open-limit switch for outputting a throttle valve fully-opened position signal;
   (g) a microcomputer responsive to said accelerator pedal stroke potentiometer, said throttle valve potentiometer, said throttle valve close-limit switch and said throttle valve open-limit switch, said microcomputer determining a target throttle valve opening position $\theta_T$ according to the detected accelerator pedal stroke signal in accordance with a table look-up and an interpolation calculation and outputting a target throttle valve opening position control signal, said microcomputer further setting the target throttle valve opening position control signal to zero in response to the throttle valve fully-opened position signal when the determined target throttle valve opening position $\theta_T$ is greater than the detected actual throttle valve opening position $\theta_A$ and in response to the throttle valve fully-closed position signal when the determined target throttle valve opening position $\theta_T$ is smaller than the detected actual throttle valve opening position $\theta_A$; and (h) an actuator for driving said throttle valve to a target opening position in response to the target throttle valve opening position control signal outputted from said microcomputer.

3. A method of controlling a throttle of an automotive vehicle, which comprises the following steps of:

(a) detecting an accelerator pedal stroke;

(b) calculating a target throttle valve opening position according to the detected accelerator pedal stroke;

(c) detecting an actual throttle valve opening position;

(d) calculating the difference $\theta$ between the target throttle valve opening rate position $\theta_T$ and the detected throttle valve opening position $\theta_A$;

(e) if the calculated difference $\theta$ is zero, outputting the calculated difference to set the actual throttle valve opening position to the target throttle valve opening position;

(f) if the calculated difference $\theta$ is positive, checking whether or not a throttle valve is fully open;

(g) if not fully open, returning to the step (e) above;

(h) if fully open, setting the calculated difference $\theta$ to zero before returning to the step (e) above;

(i) if the calculated difference $\theta$ is negative, checking whether or not a throttle valve is fully closed;

(j) if not fully closed, returning to the step (e) above; and (k) if fully open, setting the calculated difference $\theta$ to zero before returning to the step (e) above.

* * * * *